(12) United States Patent
Snow

(10) Patent No.: US 10,357,134 B2
(45) Date of Patent: Jul. 23, 2019

(54) TOWEL REPLACEMENT NOTIFICATION

(71) Applicant: Matthew Snow, Paducah, KY (US)

(72) Inventor: Matthew Snow, Paducah, KY (US)

( * ) Notice: Subject to any disclaimer, the term of this patent is extended or adjusted under 35 U.S.C. 154(b) by 0 days.

(21) Appl. No.: 15/800,580

(22) Filed: Nov. 1, 2017

(65) Prior Publication Data

US 2018/0132675 A1   May 17, 2018

Related U.S. Application Data

(60) Provisional application No. 62/420,671, filed on Nov. 11, 2016.

(51) Int. Cl.
| | |
|---|---|
| *A47K 10/24* | (2006.01) |
| *G06Q 50/12* | (2012.01) |
| *H04L 12/28* | (2006.01) |
| *A47K 10/02* | (2006.01) |
| *E05B 47/02* | (2006.01) |
| *E05C 19/16* | (2006.01) |
| *E05B 47/00* | (2006.01) |

(52) U.S. Cl.
CPC .......... *A47K 10/24* (2013.01); *A47K 10/025* (2013.01); *E05B 47/02* (2013.01); *E05C 19/16* (2013.01); *G06Q 50/12* (2013.01); *H04L 12/2827* (2013.01); *E05B 47/0012* (2013.01); *E05B 2047/0068* (2013.01)

(58) Field of Classification Search
CPC ...... A47K 10/24; A47K 10/025; G06Q 50/12; E05B 47/02; E05B 47/0012; E05B 2047/0068; H04L 12/2827; E05C 19/16

USPC ................................................. 700/231–244
See application file for complete search history.

(56) References Cited

U.S. PATENT DOCUMENTS

| | | | |
|---|---|---|---|
| 2,295,955 A | 9/1942 | La Page | |
| 2,839,202 A | 6/1958 | Arnett | |
| 4,053,954 A | 10/1977 | Chapman | |
| 4,918,290 A | 4/1990 | DeMars | |
| 5,840,675 A | 11/1998 | Yeazell | |
| 6,505,367 B2 | 1/2003 | Griffin et al. | |
| 7,348,884 B2 * | 3/2008 | Higham | G06K 17/00 340/5.54 |
| 7,728,711 B2 * | 6/2010 | Shoenfeld | E05B 47/0012 340/5.1 |
| 7,809,470 B2 * | 10/2010 | Shoenfeld | G08B 13/2402 221/123 |
| 2008/0052816 A1 | 3/2008 | Gillis | |
| 2008/0122615 A1* | 5/2008 | Shoenfeld | G08B 13/14 340/540 |
| 2014/0172161 A1* | 6/2014 | Norris | G07F 11/005 700/237 |
| 2015/0066207 A1 | 3/2015 | Erb | |
| 2016/0113449 A1 | 4/2016 | Gainey | |

* cited by examiner

*Primary Examiner* — Michael Collins
(74) *Attorney, Agent, or Firm* — Dinsmore & Shohl LLP

(57) ABSTRACT

Embodiments of a towel notification and dispensing device are provided. Some embodiments include a towel compartment that receives a fresh towel, a compartment door that provides access to the towel compartment, and a sensor that detects when the fresh towel has been removed from the towel compartment. Some embodiments include an output device that, in response to a determination that the fresh towel has been removed from the towel compartment provides an indication that the fresh towel needs to be replaced.

20 Claims, 8 Drawing Sheets

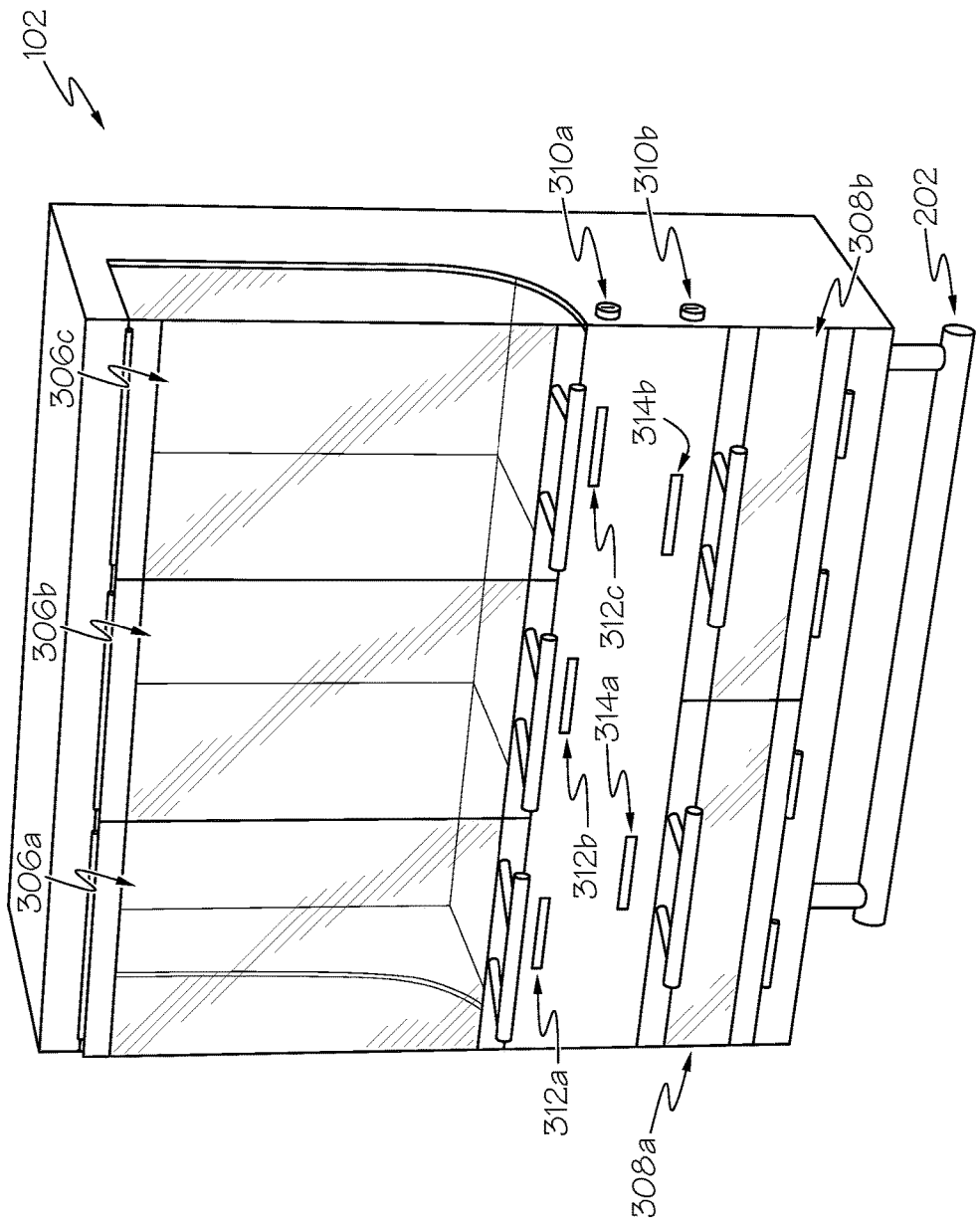

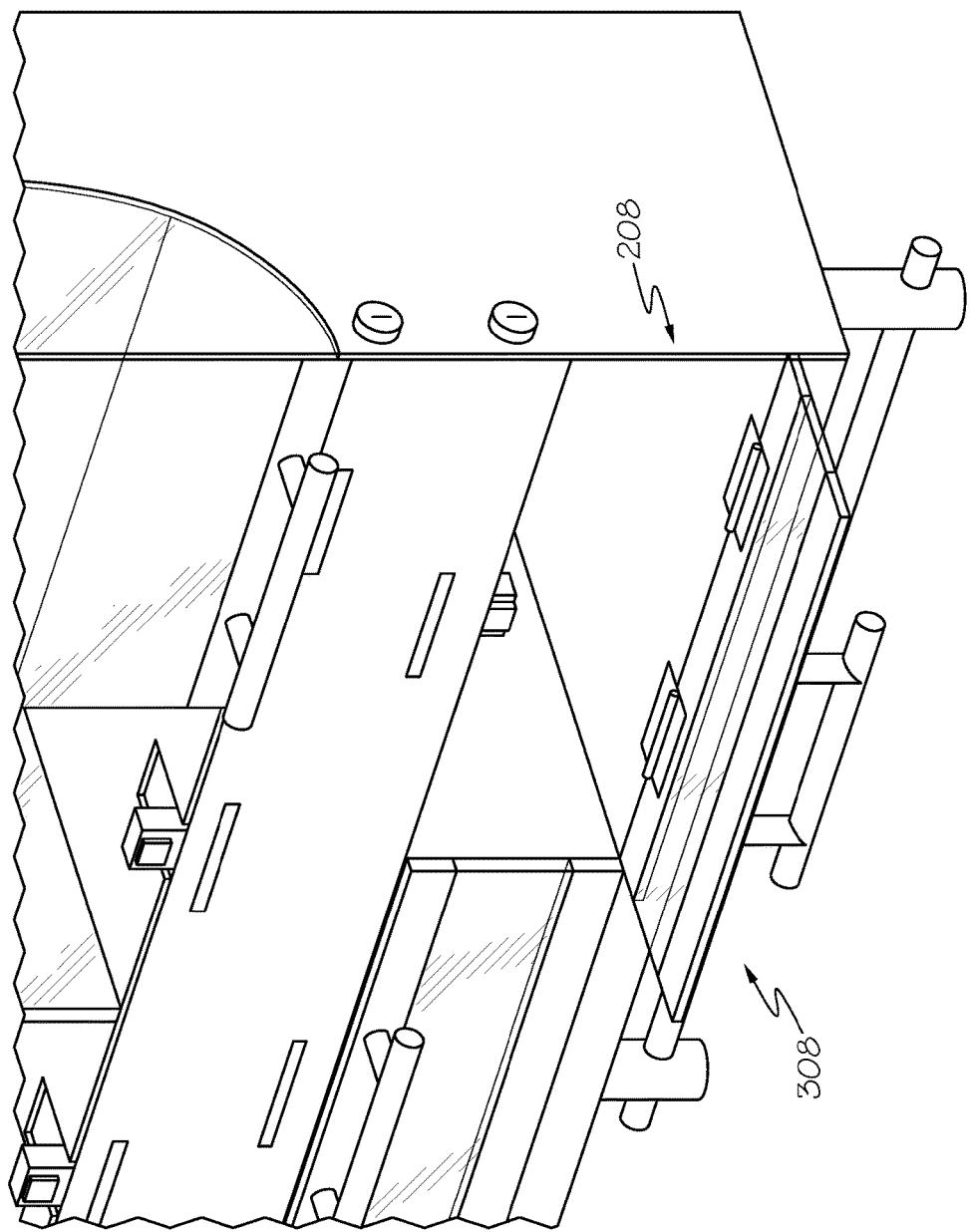

TOWEL REPLACEMENT NOTIFICATION

CROSS REFERENCE

This application claims the benefit of U.S. Provisional Ser. No. 62/420,671, filed Nov. 11, 2016, which is incorporated by reference in its entirety.

TECHNICAL FIELD

Embodiments described herein generally relate to towel placement notification and, more specifically, to embodiments of systems and devices that monitor when towels have been replaced in a hotel room or other environment and notify housekeeping accordingly.

BACKGROUND

When guests stay in a hotel, hospital, or other temporary lodging, clean towels and other amenities are often provided. As an example, when a hotel guest stays multiple days in a hotel, the hotel housekeeping typically replaces used towels with fresh towels during the guest's stay. With that said, oftentimes hotel managers have difficulty ensuring that fresh towels are provided according to the predetermined schedule. As such, a need exists in the industry.

SUMMARY

Embodiments of a towel notification and dispensing device are provided. Some embodiments include a towel compartment that receives a fresh towel, a compartment door that provides access to the towel compartment, and a sensor that detects when the fresh towel has been removed from the towel compartment. Some embodiments include an output device that, in response to a determination that the fresh towel has been removed from the towel compartment provides an indication that the fresh towel needs to be replaced.

In another embodiment, a towel notification and dispensing device includes a towel compartment that receives fresh towels, a compartment door that provides access to the towel compartment, and a sensor that is coupled to the towel compartment for detecting whether any of the fresh towels are removed from the towel compartment. Some embodiments include a locking mechanism that, when actuated, locks the compartment door to prevent access to the towel compartment, an output device for indicating a state of the towel notification and dispensing device, and an integrated computing device. The integrated computing device may include a processor and a memory component. The memory component stores logic that, when executed by the processor, causes the towel notification and dispensing device to receive output from the sensor that is indicative that at least one of the fresh towels has been removed, in response to determining that none of the fresh towels remain in the towel compartment, actuate the locking mechanism and cause the output device to indicate that no towels remain in the towel compartment, and in response to determining that the locking mechanism has been unactuated and new fresh towels have been received by the towel compartment, cause the output device to indicate that the new fresh towels are present in the towel compartment.

In yet another embodiment, a system includes a towel notification and dispensing device that includes a towel compartment that receives fresh towels, a compartment door that provides access to the towel compartment, and a sensor that is coupled to the towel compartment for detecting whether any of the fresh towels are removed from the towel compartment. In some embodiments the towel notification and dispensing device further includes an output device for indicating a state of the towel notification and dispensing device and an integrated computing device that includes a processor and a memory component. The memory component may store logic that, when executed by the processor, causes the towel notification and dispensing device to receive output from the sensor that is indicative that at least one of the fresh towels has been removed and, in response to determining that at least one of the fresh towels has been removed in the towel compartment, cause the output device to indicate that at least one of the fresh towels has been removed from the towel compartment. In some embodiments, the logic may cause the system to, in response to determining that at least one new fresh towel has been received by the towel compartment to replace the removed fresh towel, cause the output device to indicate that the at least one new fresh towel is present in the towel compartment.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 3A-3C depict various perspective views of a towel notification and dispensing device, according to embodiments described herein;

DETAILED DESCRIPTION

Embodiments disclosed herein include systems and methods for towel replacement notification. Some embodiments provide a mechanism for dispensing fresh towels, such as bath towels, hand towels, washcloths (collectively referred to herein as "towels"), and/or other items to prevent unnecessary laundering in a hospitality/hotel, healthcare, and/or commercial environment. The towels that are not used by a patient or guest can easily be identified by the housekeeping staff so that unused towels will not have to be laundered. The towels will remain in a clean and enclosed state so that they are not contaminated by prior patients or guests.

Accordingly, embodiments described herein may include a plurality of towel compartments, including at least one large towel compartment, at least one hand towel compartment, and/or at least one washcloth compartment. The towel notification and dispensing device may include a door open sensor to sense when the door has been opened by a guest and/or other towel removal sensor to detect when a towel has been removed. The towel removal sensor may include a door magnet, a laser, a weight sensor, an image sensor and/or other sensor that detects when a towel has been removed from the towel notification and dispensing device.

The towel notification and dispensing device may additionally include an output device for indicating to guests and/or housekeeping whether towels have been removed. Once a towel has been removed from the towel notification and dispensing device and the towel removal sensor has triggered, the output device may output a visual indicator to inform the guest and/or housekeeping of the event. This visual indicator may include a colored light, LCD indicator, LED indicator, etc. Similarly, some embodiments may be configured to communicate this indication to a remote computing device, as described in more detail below. If all doors are closed and no towels have been removed, the visual indicator may provide an output (such as a green light) indicating that all towels are clean and untouched. Once a compartment door has been opened for a single compartment, the light may turn red. Once the towel has been removed and the compartment door is shut, the visual indicator for that compartment may remain red until housekeeping comes to the room to provide at least one new fresh towel.

Embodiments may also include a reset switch that can be activated by the housekeeping staff and/or other administrator. In some embodiments, the reset switch may take the form of a key switch on the towel notification and dispensing device; however this is not a requirement. Once the housekeeper has replaced all of the removed fresh towels with new fresh towels, the reset switch may be activated to reset the system back to a state indicating that all towels are clean.

Figure 1:
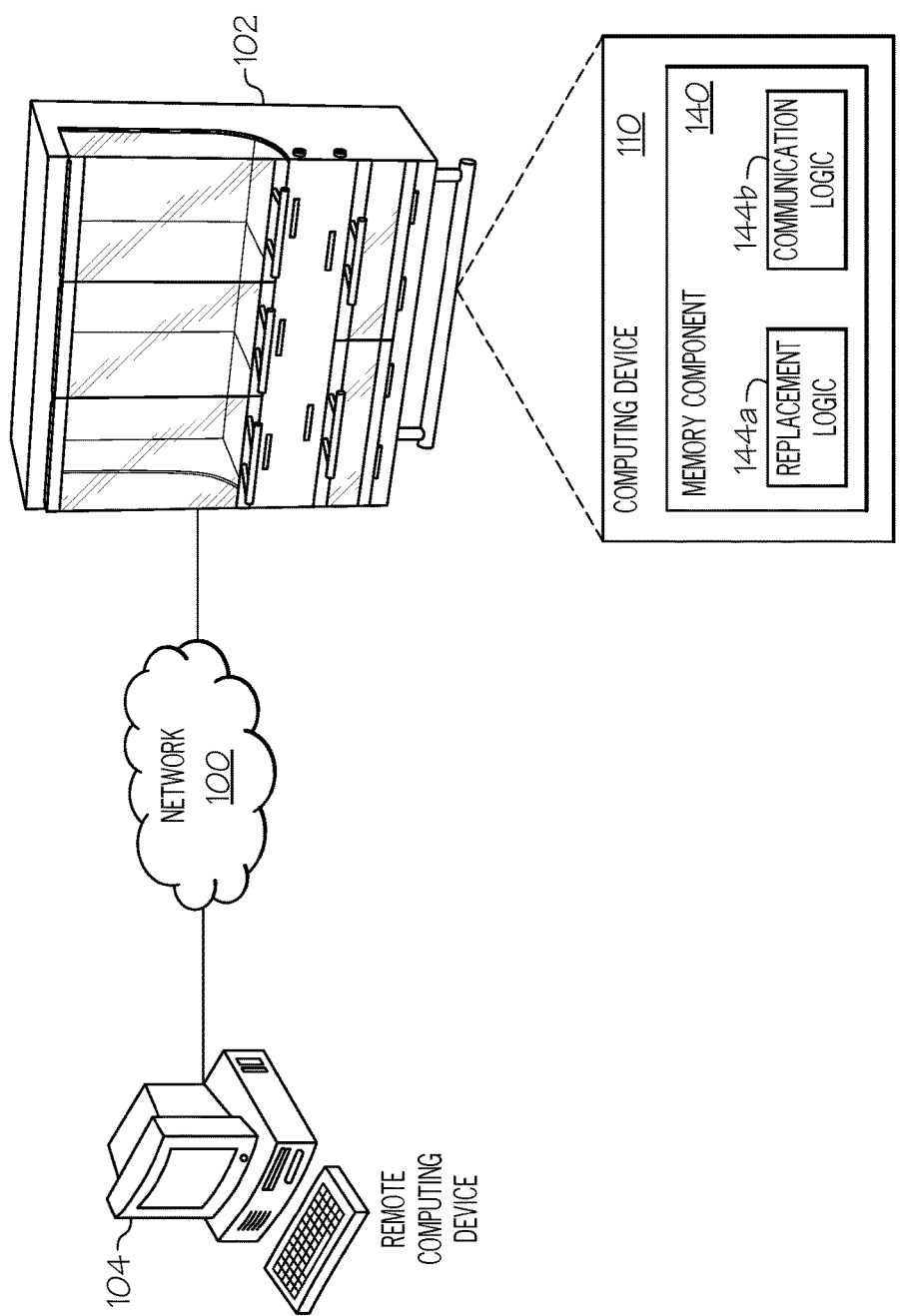
FIG. 1 depicts a computing environment for towel replacement notification, according to embodiments described herein.

Referring now to the drawings, FIG. 1 depicts a computing environment for towel replacement notification, according to embodiments described herein. As illustrated, FIG. 1 includes a network 100, which is coupled to a towel notification and dispensing device 102 and a remote computing device 104. The towel notification and dispensing device 102 may include an integrated computing device 110, which includes a memory component 140. The memory component 140 may store replacement logic 144a and communication logic 144b.

The replacement logic 144a may include algorithms, software, computer-readable instructions, etc. for receiving sensor data and causing the integrated computing device 110 to determine if a towel needs to be replaced. The communication logic 144b may be configured for providing output signals to an output device 314 (FIG. 3A) and/or for communicating with the remote computing device 104. As an example, some embodiments may be configured for a plurality of towel notification and dispensing devices 102 to report their individual status to a central location (such as the remote computing device 104). Additionally, commands, preferences, and/or other data may be communicated from the remote computing device 104 to the integrated computing device 110 via the communications logic 144b. As an example, embodiments described herein may be configured to receive a command from the remote computing device 104 indicative of a predicted time when the new fresh towels will be received by the towel compartment.

Some embodiments may include a power free and control free option. These embodiments may include a latching system to change the output device 314 (FIG. 3A) that will not require electrical power to function. Some embodiments may include an overlapping loop that intersects the frame with each door. The doors may be configured to use these loops to seal shut with a plastic and/or paper seal. The seals may be broken or otherwise indicate each time a door is opened.

Additional options may include a key fob input where the housekeeper could use a badge or key fob to reset the compartments. Embodiments may also include a multi-bar indicator light on the side to show the current battery life. Another embodiment may include a wireless internet card where the devices could be synced via the LAN to a dashboard per facility or at a system level.

Additionally, some embodiments may be connected to the network 100 via Ethernet, internet, Wi-Fi, etc. and may be controlled and/or monitored remotely. As an example, some embodiments may detect that a fresh towel has been removed from the towel notification and dispensing device 102, such as via a weight sensor, door sensor, proximity sensor, image sensor, proximity sensor, etc.

In embodiments for hotels and hospitals, the towel notification and dispensing device 102 may also determine that a user opened the towel notification and dispensing device 102 by first determining that the room has been issued to a user (such as a hotel guest and/or hospital patient) and the user accessing the room, such as via an electronic room key. Based on a determined number of fresh towels that the towel notification and dispensing device 102 detects have been removed, a signal may be sent to housekeeping (e.g., at the remote computing device 104) to indicate the number of new fresh towels that are need to replace the removed fresh towels. Since the remaining fresh towels often do not need to be replaced, this may assist housekeeping by knowing how many towels need to be washed and delivered in the next cleaning cycle. Additionally, some embodiments may include an option on the towel notification and dispensing device 102 for the user to manually request additional towels. As such, a user input device may also be included and coupled to the integrated computing device 110 to receive this input and communicate data to the remote computing device 104 and/or elsewhere.

Regardless, when housekeeping cleans the room, the towel notification and dispensing device 102 may provide a visual notification that the towels need to be replaced (even if the sensors indicate that towels have been removed and returned to the towel notification and dispensing device 102 by the guest). As such, some embodiments may distinguish between housekeeping replacing towels and a guest replacing towels to ensure that only authorized personnel replace towels. Some embodiments may additionally include a timer to monitor when towels are replaced. As such, these embodiments may utilize key (or key fob) or timer to ensure that housekeeping is replacing the towels.

As an example, some embodiments of the towel notification and dispensing device 102 include a timer that may start when new fresh towels are received by the towel notification and dispensing device 102. Thus, when the timer expires after a predicted time and no fresh towels have been removed, the towel notification and dispensing device 102 may alert housekeeping that at least one remaining new fresh towel should be replaced for freshness and/or that the towel notification and dispensing device 102 might be malfunctioning. To this end, embodiments of the towel notification and dispensing device 102 may include a humidity sensor, mold sensor, humidity control device, etc. for monitoring and/or controlling the internal environment of the towel notification and dispensing device 102 and/or for determining the freshness of the towels.

The remote computing device 104 may also be coupled to the network 100 and may include a personal computer, laptop, tablet, mobile device, server, etc. The remote computing device 104 may be configured to monitor the status of one or more towel notification and dispensing device 102 for operation and/or for towel status. Depending on the embodiment, the remote computing device 104 may be configured to communicate data to the integrated computing device 110 and/or received data from the integrated computing device 110. As an example, if a user request additional towels, the remote computing device 104 may provide a confirmation that the request was received, an approximate time that the towels will arrive and/or other data.

Figure 2:
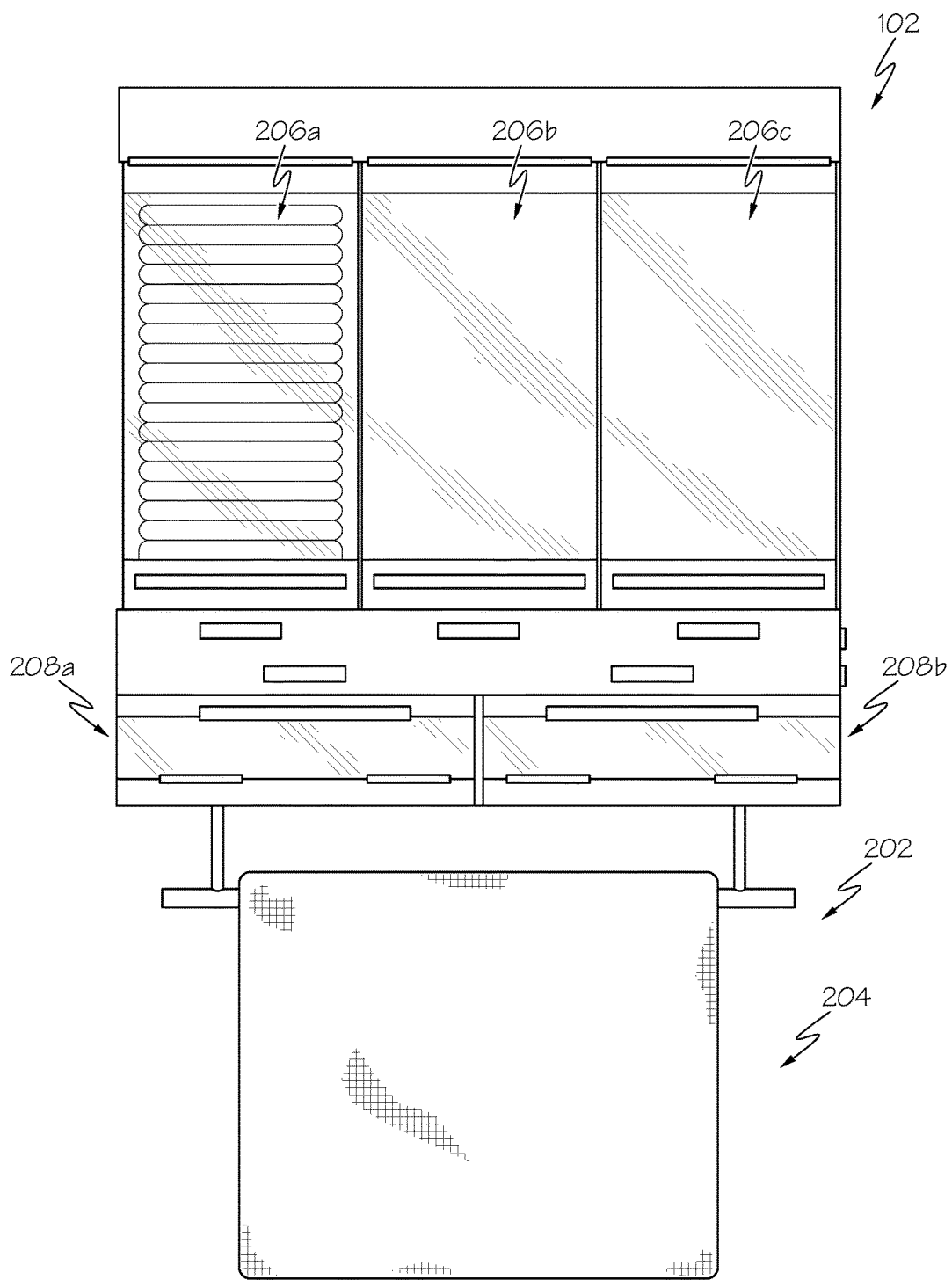
FIG. 2 depicts a front view of a towel notification and dispensing device, according to embodiments described herein.

FIG. 2 depicts a front view of a towel notification and dispensing device 102, according to embodiments described herein. As illustrated, the towel notification and dispensing device 102 includes, a towel rack 202 for storing a towel 204, at least one large towel compartment 206a, 206b, 206c (collectively and individually referred to as large towel compartment 206), and at least one small towel compartment 208a, 208b (collectively and individually referred to as small towel compartment 208). Specifically, the large towel compartment 206 may be configured to receive one or more fresh towels, which may be folded and stacked in each respective large towel compartment 206. The each small towel compartment 208 may be configured to receive at least one hand towel, at least one wash cloth, etc.

Figure 3B:
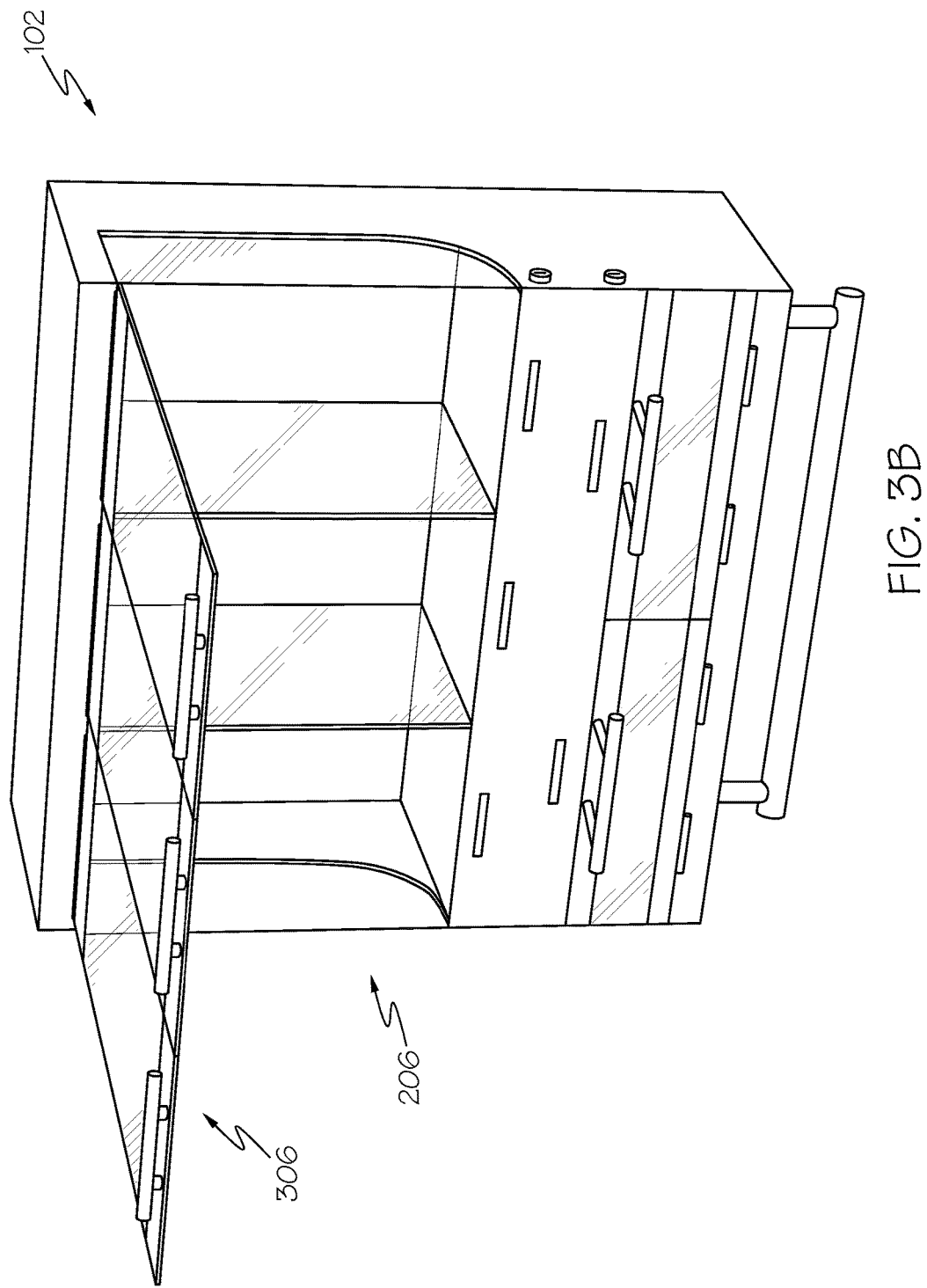

FIGS. 3A-3C depict various perspective views of a towel notification and dispensing device 102, according to embodiments described herein. As illustrated, the towel notification and dispensing device 102 may include large compartment doors 306a, 306b, 306c that cover at least a portion of the openings to the large towel compartments 206a, 206b, 206c, respectively. Additionally, the towel notification and dispensing device 102 may include small compartment doors 308a, 308b, which cover at least a portion of the openings to the small towel compartments 208a, 208b, respectively. The large compartment doors 306 and the small compartment doors 308 may be coupled to the towel notification and dispensing device 102 via a hinge mechanism positioned on a first end of the respective opening such that the large compartment doors 306 and/or the small compartment doors 308 rotate substantially perpendicular to ground.

The large compartment doors 306 and the small compartment doors 308 may be removably secured to an opposite side of the respective opening with a magnet, latch, and/or other securing mechanism, as illustrated in FIGS. 3B and 3C. Additionally, one or more door sensors (e.g., via the magnet securing mechanism) may be provided to detect whether any of the large compartment doors 306 and/or small compartment doors 308 have been opened and/or closed. Some embodiments may utilize a weight sensor or other sensor to determine whether any fresh towels have been removed from the respective towel compartment 206, 208, such that the removed fresh towel may be replaced.

The towel notification and dispensing device 102 may additionally include one or more locking mechanisms 310a 310b for accessing and/or for automatically locking access to the large towel compartments 206 and the small towel compartments 208, respectively. Depending on the particular embodiment, the locking mechanism 310a may be communicatively coupled to one or more output devices 312a, 312b, 312c, one or more output devices 314a, 314b the large compartment doors 306 and/or the small compartment doors 308.

As an example, the towel notification and dispensing device 102 may be unlocked such that a user (such as a hotel guest) may access any of the large towel compartments 206 and/or the small towel compartments 208. In this example, the towel notification and dispensing device 102 may include one or more sensors to determine whether a towel has been removed, that one of the large compartment doors 306 has been opened, and/or that one of the small compartment doors 308 has been opened. Based on this sensor output, the integrated computing device 110 (FIG. 1) may determine that the fresh towels may have been accessed.

As such, the corresponding output device 312 may signify this change. In some embodiments, the output devices 312, 314 may provide a solid green light when each of the towel compartments 206, 208 have fresh towels (e.g., the respective locking mechanism 310 is unactuated). When one or more of the towel compartments 206, 208 is missing a towel and/or the compartment has been opened by a user, the light may turn red to identify that the towels in that compartment need to be replaced and/or additional towels need to be added.

In some embodiments, once the towel notification and dispensing device 102 detects that all of the fresh towels in one or more of the towel compartments 206, 208 have been removed, the compartments may be locked via the locking mechanisms 310. This prevents a user from returning used towels to the towel notification and dispensing device 102. Similarly, some embodiments may utilize the locking mechanism 310 to require payment by a user prior to gaining access to one or more of the large towel compartments 206, 208.

It should be understood that while some embodiments may utilize the locking mechanisms 310, described above, this is merely an example. Some embodiments may not lock the towel compartments 206, but instead may use a reset switch or other similar mechanism for simply resetting the status of the towel notification and dispensing device 102 when new fresh towels are received.

Figure 4:
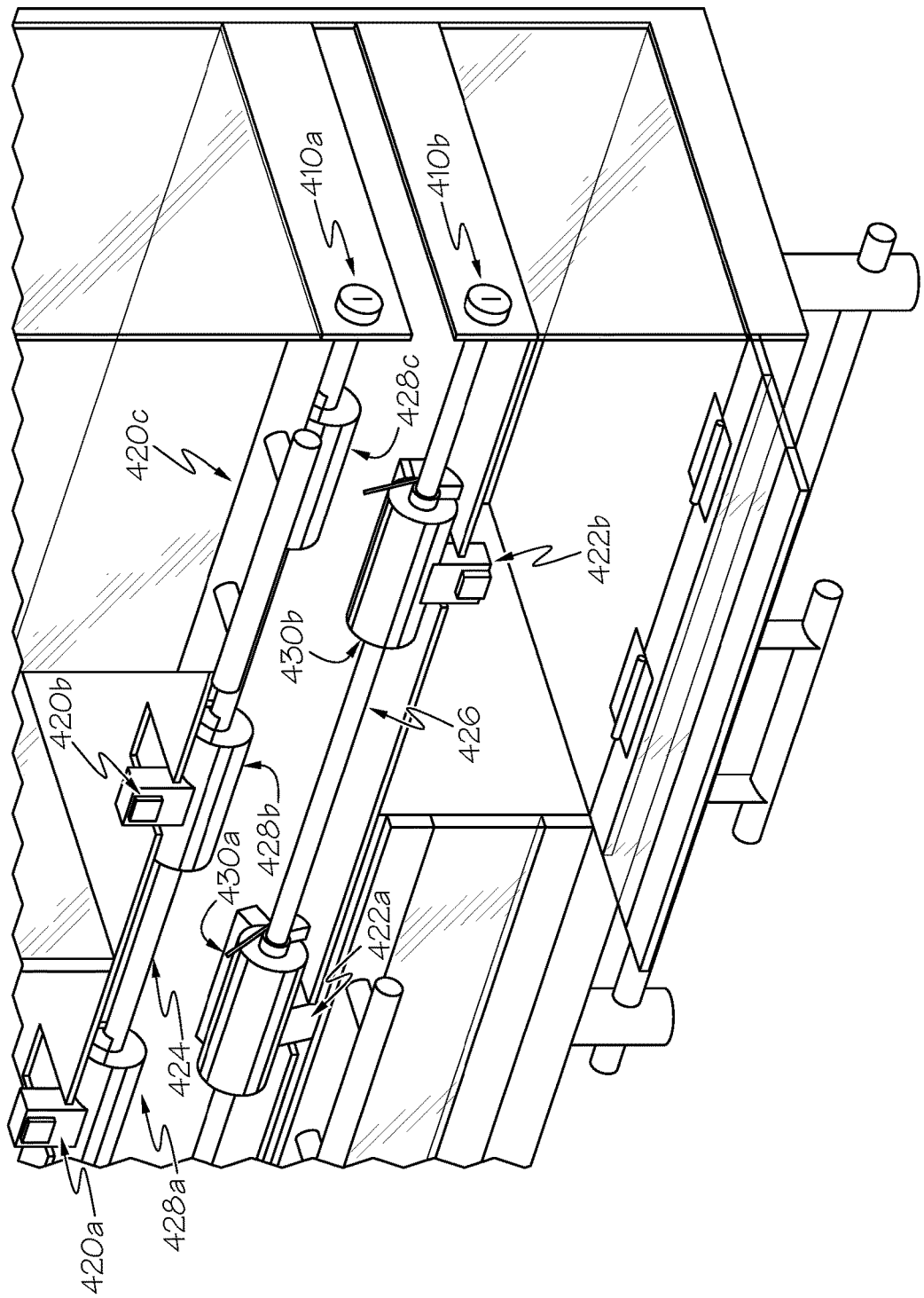
FIG. 4 depicts another perspective view of a towel notification and dispensing device, with a locking mechanism, according to embodiments described herein.

FIG. 4 depicts another perspective view of a towel notification and dispensing device 102, with a locking mechanism 310, according to embodiments described herein. As illustrated, the locking mechanisms 310 includes respective authentication components 410a, 410b, such as a key lock, a wireless authentication receiver (for receiving data from a fob), and/or other mechanism for granting and denying access. Additionally, the locking mechanisms 310 include device latching components 420a, 420b, 420c, 422a, and 422b which may be utilized to secure the respective compartment doors 306, 308 from opening. Also included are locking rods 424, 426, as well as locking cylinders 428a, 428b, 428c, 430a, 430b that are coupled to the respective device latching components 420a, 420b, 420c, 422a, and 442b.

Figure 5:
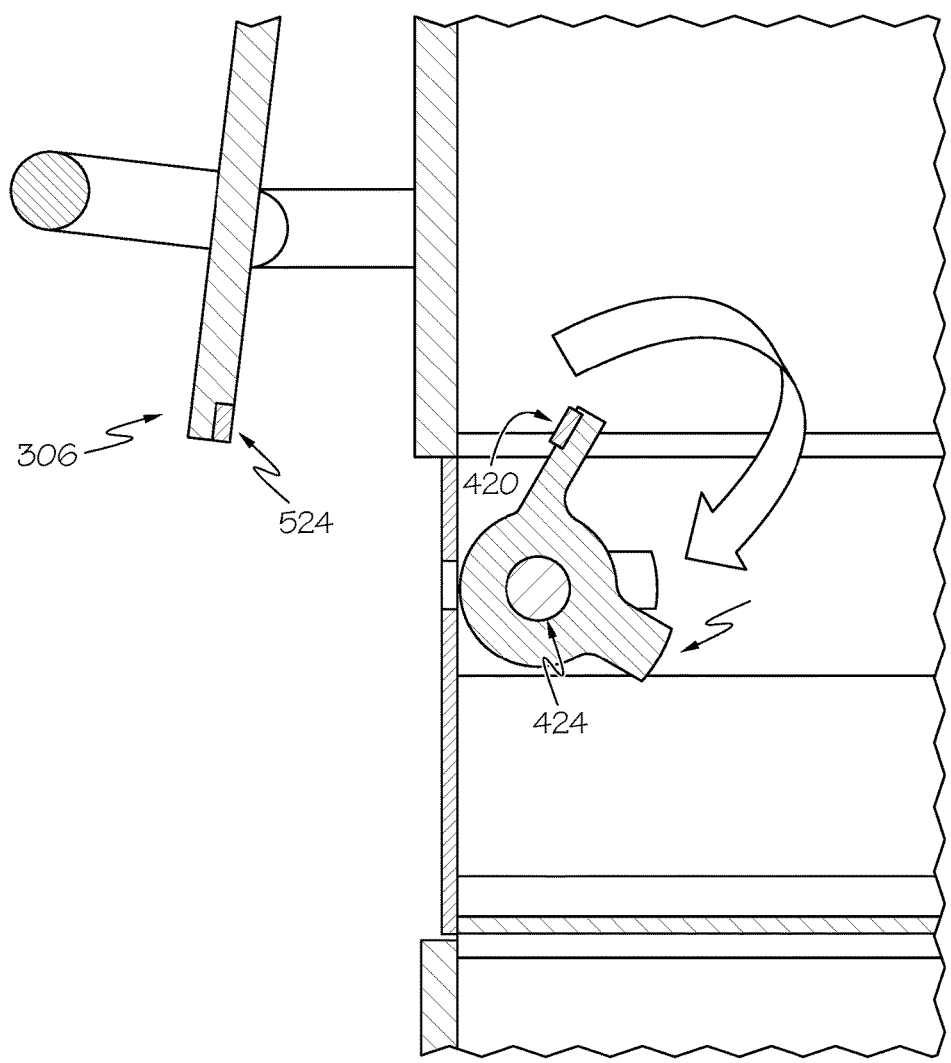
FIG. 5 depicts a side view of the locking mechanism, according to embodiments described herein.

FIG. 5 depicts a side view of the locking mechanism 310, according to embodiments described herein. As illustrated, the large compartment door 306 (and other compartment doors 306) includes a door latching component 524 that correspond with the device latching component 420. The door latching component 524 may be an oppositely polarized magnet or a compatible physical latching component to removably secure the large compartment door 306 to the towel notification and dispensing device 102. Additionally, the locking cylinder 428 includes an arm for the device latching component 420. Thus, when the latching rod 424 is rotated (such as by a physical turn of a key and/or via a motor), the arm of the latching cylinder 428 is rotated away from the large compartment door 306, thereby releasing the large compartment door 306 to be opened.

As discussed above, some embodiments of the locking mechanisms 310 may not lock the compartment doors 306, 308, but may instead be used to simply monitor when the compartment doors 306, 308 are opened. As such, these embodiments may use the key and key fob to reset the state to the towel notification and dispensing device 102 to indicate that fresh towels have been received. Specifically, when the compartment door 306, 308 is opened, the device latching component 420 disengages from the door latching component 524, thus causing the latching rod 424 to rotate in the direction of the arrow. This causes the output device 312 to indicate that that the door has been accessed. Thus, when housekeeping replaces the towels, and turns the key, the output device 312 will reset and the door will reconnect via the device latching component 420 and door latching component 524. As such, the components depicted in FIG. 5 may be configured as a sensor, even in those embodiments where not electrical power is utilized. Specifically, by detecting that the magnet is no longer in the vicinity of the device latching component 420, the latching rod 424 rotates to a disengaged position and activates the output device 314 (which also may be powered or unpowered).

Figure 6:
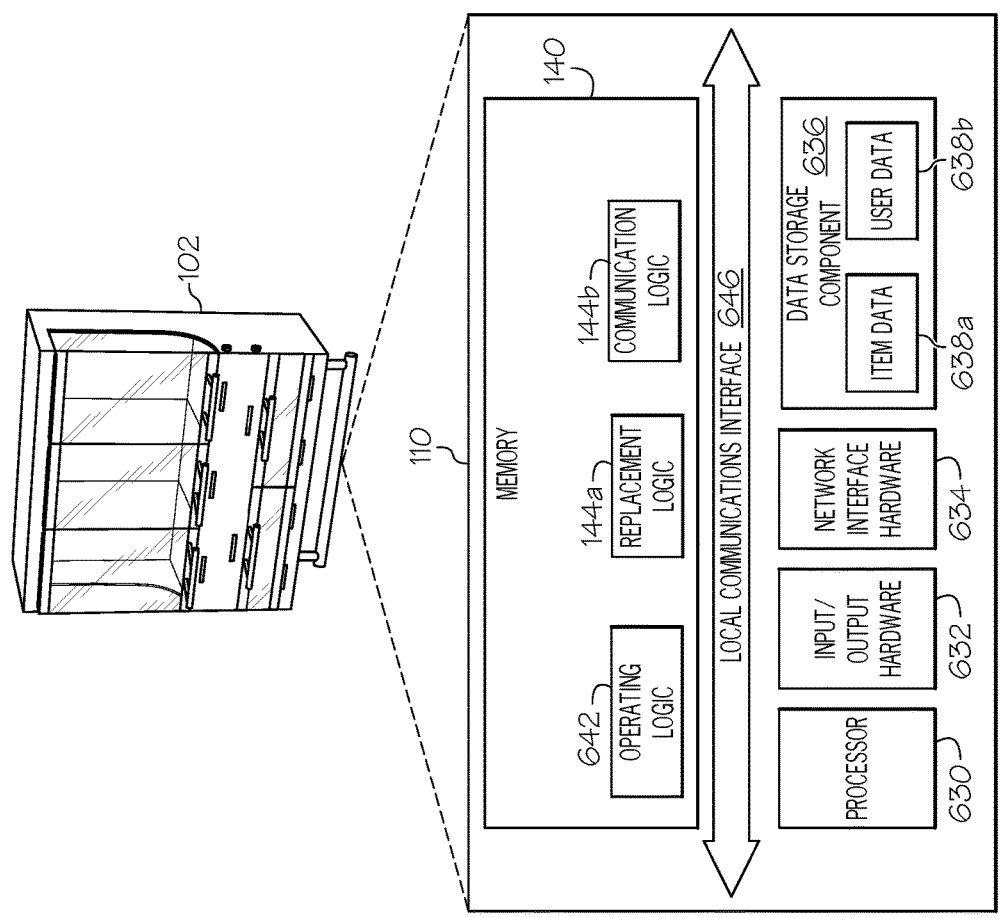
FIG. 6 depicts a computing device for a towel replacement notification and dispensing device, according to embodiments described herein.

FIG. 6 depicts an integrated computing device 110 for a towel replacement notification and dispensing device 102, according to embodiments described herein. As illustrated, the integrated computing device 110, which includes a processor 630, input/output hardware 632, the network interface hardware 634, a data storage component 636 (which stores item data 638a, user data 638b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the integrated computing device 110 and/or external to the integrated computing device 110.

The memory component 140 may store operating logic 642, the replacement logic 144a and the communication logic 144b. The replacement logic 144a and the communication logic 144b may each include a plurality of different pieces of logic, each of which may be embodied as a computer program, firmware, and/or hardware, as an example. A local interface 646 is also included in FIG. 6 and may be implemented as a bus or other communication interface to facilitate communication among the components of the remote computing device 104.

The processor 630 may include any processing component operable to receive and execute instructions (such as from a data storage component 636 and/or the memory component 140). The input/output hardware 632 may include and/or be configured to interface with microphones, speakers, a display, and/or other hardware.

The network interface hardware 634 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the integrated computing device 110 and other computing devices, such as the remote computing device 104.

The operating logic 642 may include an operating system and/or other software for managing components of the integrated computing device 110. As also discussed above, the replacement logic 144a may reside in the memory component 140 and may be configured to cause the processor 630 to determine whether towels need to be replaced. Similarly, the communication logic 144b may be utilized to communicate with the user and/or other devices regarding the conclusions made via the replacement logic 144a.

It should be understood that while the components in FIG. 6 are illustrated as residing within the integrated computing device 110, this is merely an example. In some embodiments, one or more of the components may reside external to the integrated computing device 110. It should also be understood that, while the integrated computing device 110 is illustrated as a single device, this is also merely an example. In some embodiments, the replacement logic 144a and the communication logic 144b may reside on different computing devices. As an example, one or more of the functionality and/or components described herein may be provided by the integrated computing device 110 and/or the remote computing device 104, which may be coupled to the integrated computing device 110 via the network 100.

Additionally, while the integrated computing device 110 is illustrated with the replacement logic 144a and the communication logic 144b as separate logical components, this is also an example. In some embodiments, a single piece of logic (and/or or several linked modules) may cause the integrated computing device 110 to provide the described functionality.

As illustrated above, various embodiments for towel replacement notification are disclosed. These embodiments ensure that fresh towels are always provided to hotel guests, as well and more efficiently notify housekeeping to understand the actual demand for clean towels.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for towel replacement notification. It should also be understood that these embodiments are merely exemplary and are not intended to limit the scope of this disclosure.

What is claimed is:

1. A towel notification and dispensing device comprising:
   a towel compartment that receives fresh towels;
   a compartment door that provides access to the towel compartment;
   a sensor that is coupled to the towel compartment for detecting whether any of the fresh towels are removed from the towel compartment;
   a locking mechanism that, when actuated, locks the compartment door to prevent access to the towel compartment;
   an output device for indicating a state of the towel notification and dispensing device; and an integrated computing device that includes a processor and a memory component that stores logic that, when executed by the processor, causes the towel notification and dispensing device to perform at least the following:

receive output from the sensor that is indicative that at least one of the fresh towels has been removed;

in response to determining that none of the fresh towels remain in the towel compartment, actuate the locking mechanism and cause the output device to indicate that no towels remain in the towel compartment; and in response to determining that the locking mechanism has been unactuated and new fresh towels have been received by the towel compartment, cause the output device to indicate that the new fresh towels are present in the towel compartment and maintain the locking mechanism in an unactuated state for a user to freely retrieve at least one of the new fresh towels.

2. The towel notification and dispensing device of claim 1, wherein the logic further causes the towel notification and dispensing device to communicate the state to a remote computing device.

3. The towel notification and dispensing device of claim 1, wherein the sensor includes at least one of the following: a weight sensor, a proximity sensor, an image sensor, or a door open sensor.

4. The towel notification and dispensing device of claim 1, wherein the logic further causes the towel notification and dispensing device to perform at least the following:

start a timer in response determining that the new fresh towels have been received by the towel compartment;

in response to determining that at least one of the new fresh towels has not been removed from the towel compartment after expiration of the timer, cause the output device to indicate that the remaining new fresh towel should be replaced.

5. The towel notification and dispensing device of claim 1, wherein the towel compartment includes at least one of the following: a large towel compartment or a small towel compartment.

6. The towel notification and dispensing device of claim 1, wherein the logic further causes the towel notification and dispensing device to receive a command from a remote computing device indicative of a predicted time when the new fresh towels will be received by the towel compartment.

7. The towel notification and dispensing device of claim 1, wherein the logic further causes the towel notification and dispensing device to identify a number of fresh towels remaining in the towel compartment and communicate the number of fresh towels remaining in the towel compartment to a remote computing device.

8. A system for towel replacement notification comprising:

towel notification and dispensing device comprising:
a towel compartment that receives fresh towels;
a compartment door that provides access to the towel compartment;
a sensor that is coupled to the towel compartment for detecting whether any of the fresh towels are removed from the towel compartment;
an output device for indicating a state of the towel notification and dispensing device; and
an integrated computing device that includes a processor and a memory component that stores logic that, when executed by the processor, causes the towel notification and dispensing device to perform at least the following:

receive output from the sensor that is indicative that at least one of the fresh towels has been removed;
in response to determining that at least one of the fresh towels has been removed in the towel compartment, cause the output device to indicate that at least one of the fresh towels has been removed from the towel compartment; and
in response to determining that at least one new fresh towel has been received by the towel compartment to replace the removed fresh towel, cause the output device to indicate that the at least one new fresh towel is present in the towel compartment, wherein when the output device indicates that the at least one new fresh towel is present in the towel compartment, the towel notification and dispensing device remains in an unlocked state to allow a user to freely access the towel compartment.

9. The system of claim 8, wherein the towel notification and dispensing device further comprises a locking mechanism that, when actuated, locks the compartment door to prevent access to the towel compartment.

10. The system of claim 9, wherein the logic causes the output device to provide, in response to a determination that the locking mechanism has been unlocked and a new fresh towel has been received in the towel compartment, an indication that the towel notification and dispensing device is ready for user use.

11. The system of claim 8, further comprising a remote computing device, wherein the integrated computing device communicates data related to the state of the towel notification and dispensing device.

12. The system of claim 11, wherein the remote computing device communicates data to the towel notification and dispensing device.

13. The system of claim 8, further comprising a humidity sensor for determining whether the fresh towels need replacement.

14. A towel notification and dispensing device comprising:
a towel compartment that receives a fresh towel;
a compartment door that provides access to the towel compartment;
a locking mechanism for restricting access to the towel compartment, wherein the locking mechanism remains in an unactuated state when the fresh towel is located in the towel compartment;
a sensor that detects when the fresh towel has been removed from the towel compartment; and
an output device that, in response to a determination that the fresh towel has been removed from the towel compartment provides an indication that the fresh towel needs to be replaced.

15. The towel notification and dispensing device of claim 14, wherein in response to a determination that the fresh towel has been removed from the towel compartment, the locking mechanism automatically locks access to the towel compartment.

16. The towel notification and dispensing device of claim 15, wherein in response to a determination that the locking mechanism has been unlocked and a new fresh towel has been received in the towel compartment, the output device provides an indication that the towel notification and dispensing device is ready for user use.

17. The towel notification and dispensing device of claim 14, wherein the sensor includes at least one of the following: a weight sensor, a proximity sensor, an image sensor, or a door open sensor.

18. The towel notification and dispensing device of claim 14, wherein the locking mechanism includes a magnet.

19. The towel notification and dispensing device of claim 14, wherein the output device communicates the indication to a remote computing device.

20. The towel notification and dispensing device of claim 14, further comprising a humidity sensor for determining whether the fresh towel needs replacement.

* * * * *